United States Patent
Hall

(10) Patent No.: US 6,577,454 B2
(45) Date of Patent: Jun. 10, 2003

(54) FOLDED IMAGE INTENSIFIER OBJECTIVE LENS

(76) Inventor: John M. Hall, 1504 Dare Ct., Alexandria, VA (US) 22308

( * ) Notice: Subject to any disclaimer, the term of this patent is extended or adjusted under 35 U.S.C. 154(b) by 58 days.

(21) Appl. No.: 09/879,927

(22) Filed: Jun. 14, 2001

(65) Prior Publication Data

US 2003/0011892 A1 Jan. 16, 2003

(51) Int. Cl.$^7$ ................................................ G02B 17/00
(52) U.S. Cl. ........................ 359/733; 359/656; 359/726
(58) Field of Search .............................. 359/656–661, 359/350–351, 355–357, 362, 367, 399, 407, 433, 726, 733; 313/523, 524, 539; 250/331

(56) References Cited

U.S. PATENT DOCUMENTS 4,655,562 A * 4/1987 Kreitzer et al. ............. 250/330
6,042,239 A * 3/2000 Liepmann et al. .......... 359/601

* cited by examiner

*Primary Examiner*—Jordan M. Schwartz
(74) *Attorney, Agent, or Firm*—Milton W. Lee; John E. Holford

(57) ABSTRACT

An objective lens assembly for use in an image intensifier over the 0.6 to 0.9 micron spectral bandwidth resulting in a F# within a range of 1.0 to 1.5 and a field of view within the range of 35 to 45 degrees. The assembly includes an air-spaced doublet, a right angle fold prism for bending the optical axis 90 degrees to a reoriented optical axis, two lens subassemblies, and a field flattening lens.

10 Claims, 4 Drawing Sheets

FOLDED IMAGE INTENSIFIER OBJECTIVE LENS

BACKGROUND OF THE INVENTION

1. Field of the Invention

The present invention generally relates image intensifier optical assemblies and more specifically, to an image intensifier optical objective lens that utilizes right angle bends in its optical path.

2. Description of Prior Art

Image Intensifier night viewing systems have been used by the military since the Korean and Vietnam Wars in the late 1950's and early 1960's. Since then, steady advances in technology have resulted in the development of high performance, compact devices which can offer quality imaging approaching 20/30 vision during night conditions under partial moon and starlight. Common to most image intensification systems are three major subassemblies, the objective lens which focuses light from the scene, the intensifier "tube" which amplifies the incoming image and outputs a correlated phosphor display, and an eyepiece for viewing by a human operator. Since the intensification process depends upon amplification of light collected from the scene, it is desirable to have an objective lens with as much light collecting ability as possible. This capability is characterized by the F# parameter, which is a lens' focal length divided by its aperture diameter. The lower the F#, the better the light gathering ability. Typical intensification devices have objective lenses with F#'s ranging from 1.0 to 1.5, the limitation most often being that lenses with lower F#'s are difficult to design and impractical to fabricate. Since most image intensifier sensors are used as either rifle sights or head-mounted goggles, the objective lenses are typically all circularly symmetric and cylindrical in volume.

Recent advances in the coupling of image intensifier tubes with CCD cameras enable the sensor to transmit a video signal to the observer, who may then view the imagery on some other display device. This enables the intensifier sensor to be located in areas such as vehicle turrets, building security outcroppings, and other similar locations where the sensor is not accessible for direct viewing by the human eye. In these cases, the packaging requirements may impose restrictions on the sensor layout.

While the prior art has reported using optical assemblies for image intensifiers none have established a basis for a specific optical assembly that is dedicated to the task of resolving the particular problem at hand. What is needed in this instance is the incorporation of a right-angle bend in the optical path of the objective lens of an image intensifier to facilitate packaging requirements.

SUMMARY OF THE INVENTION

It is therefore one object of the invention to provide an objective lens of an image intensifier with a right-angle bend in its optical path.

According to the invention, there is disclosed an objective lens assembly for use in an image intensifier over the 0.6 to 0.9 micron spectral bandwidth. The lens assembly includes an air-spaced doublet on the optical axis for collecting and focusing light entering the assembly. A right angle fold prism after the air-spaced doublet on the optical axis bends the optical axis 90 degrees to a reoriented optical axis. A first lens subassembly after the right angle fold prism on the reoriented optical axis corrects for. The light is then focused by a second lens subassembly after the first lens subassembly on the reoriented optical axis. A lens element after the second lens subassembly on the reoriented optical axis provides image plane field flattening over an intensifier image field format. The lens assembly results in an F# within a range of 1.0 to 1.5 and a field of view within the range of 35 to 45 degrees.

The first lens subassembly which follows the fold prism further includes a positive powered doublet where on of the lens elements maybe filter or clear glass. The second lens subassembly may include a doublet and single lens or a cemented triplet.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
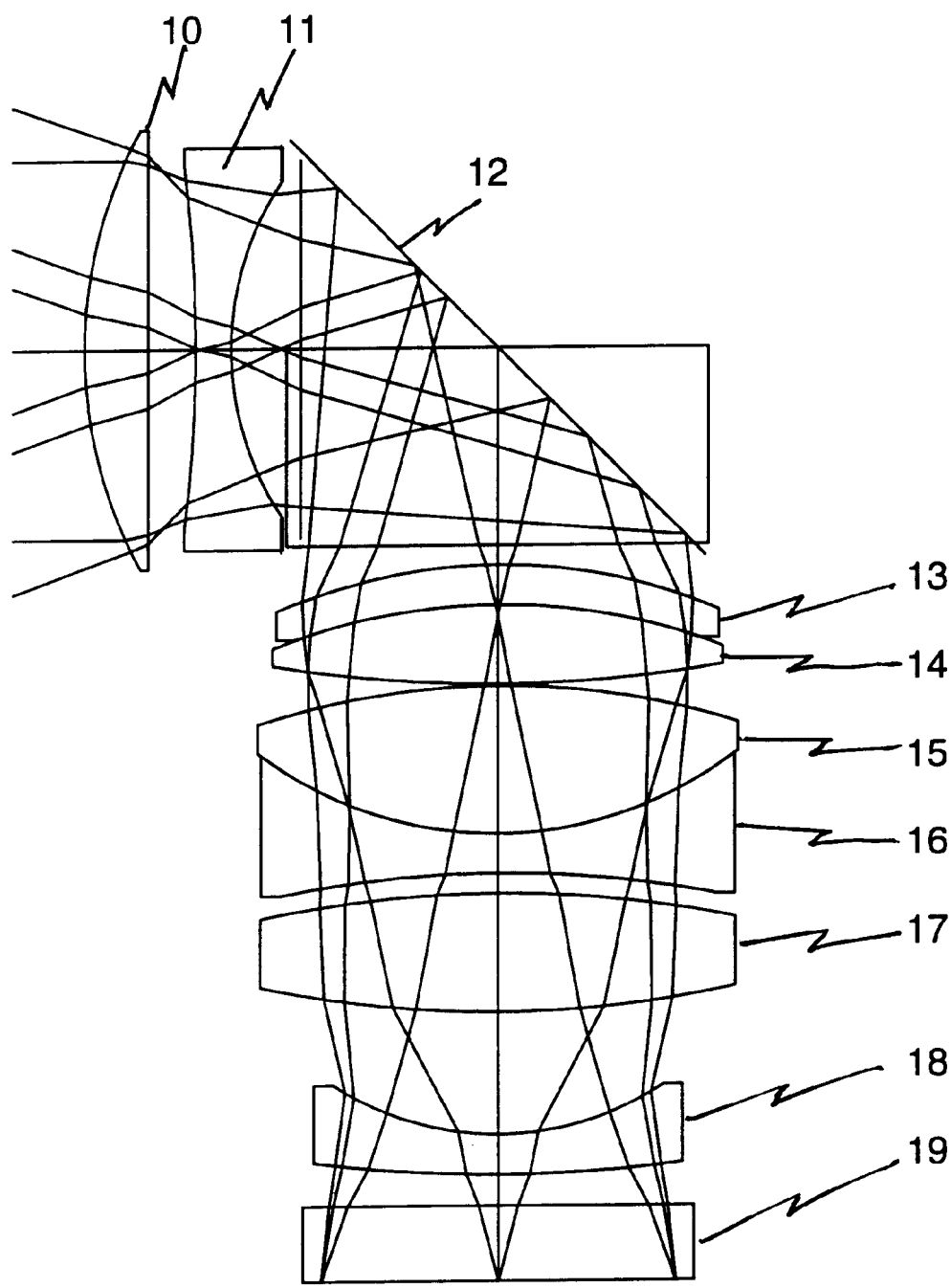
FIG. 1 is a lens ray trace of the invention.

Referring now to the drawings, and more particularly to FIG. 1, there is shown is a lens ray trace of the objective lens assembly of the invention. Light within the 0.6 to 0.9 micron spectral band from a scene enters the first pair of lenses, elements 10 and 11, which together form a negative powered air-spaced doublet. Light then passes through a right-angle fold prism 12, imparting a 90 degree bend in the optical path. Light then passes through a strong positive powered doublet consisting of elements 13 and 14. Element 13 is specifically designed to allow interchangeable use of a standard filter glass (R-64) or a standard clear glass (Schott PK51A) as desired. Light then continues through the doublet consisting of positive powered lens, element 15 and a negative lens, element 16, and then through a positive lens, element 17. The curvatures of lens elements 16 and 17 are matched, such that this group could become a cemented triplet if desired by the lens manufacturer. Light then passes though the negative field flattening lens, element 18 and on to an image field format of the glass faceplate on the intensifier tube, element 19.

Figure 2:
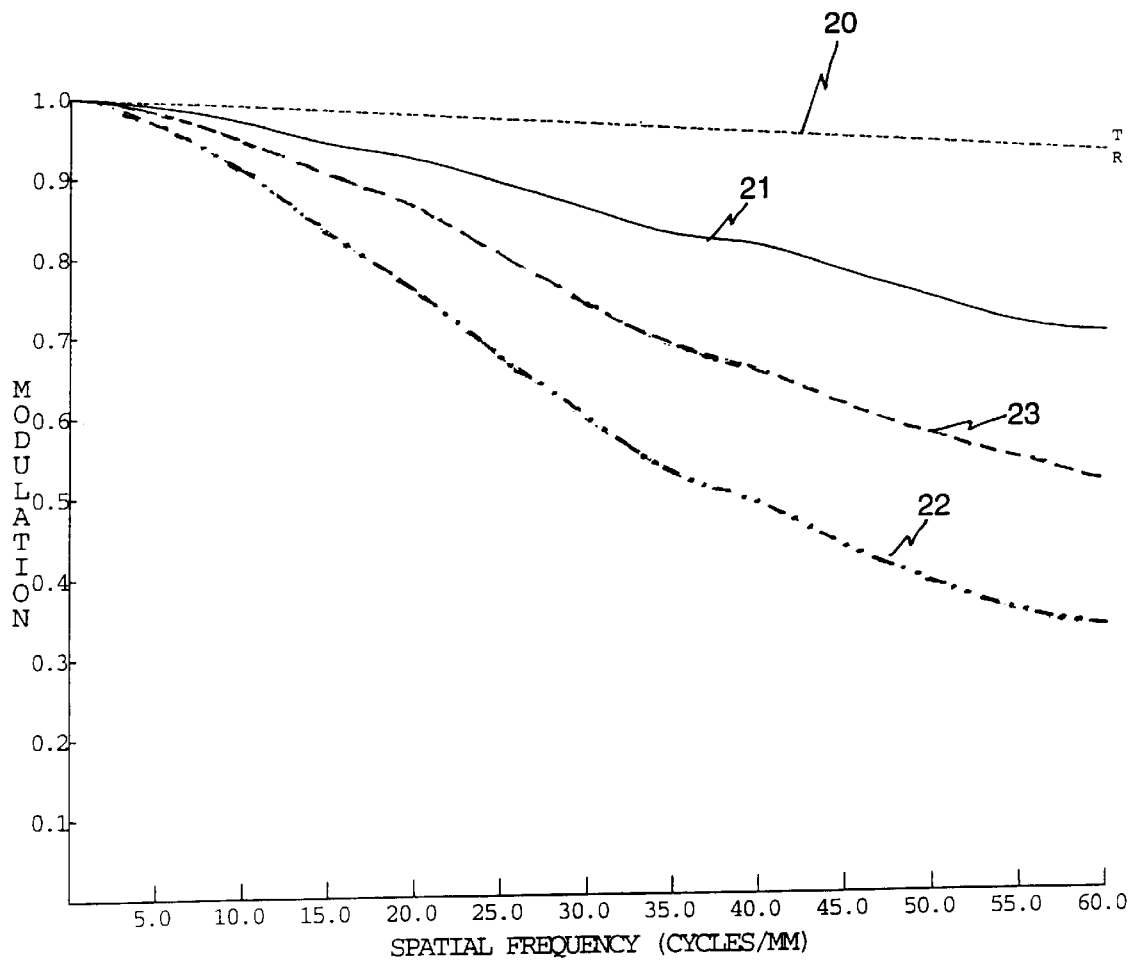
FIG. 2 is the polychromatic modulation transfer function (MTF) graph for the invention.

FIG. 2 is the polychromatic modulation transfer function (MTF) resolution performance graph of the invention. Line 20 is the diffraction limit and line 21 is the on-axis MTF. Lines 22 and 23 represent the tangential and sagittal components of the maximum FOV (1.00 field at 20.0 degrees) respectively. As seen in FIG. 2, for the on-axis field exceeding 0.70 at 60 lp/mm, there is similar performance across most of the field of view.

Figure 3:
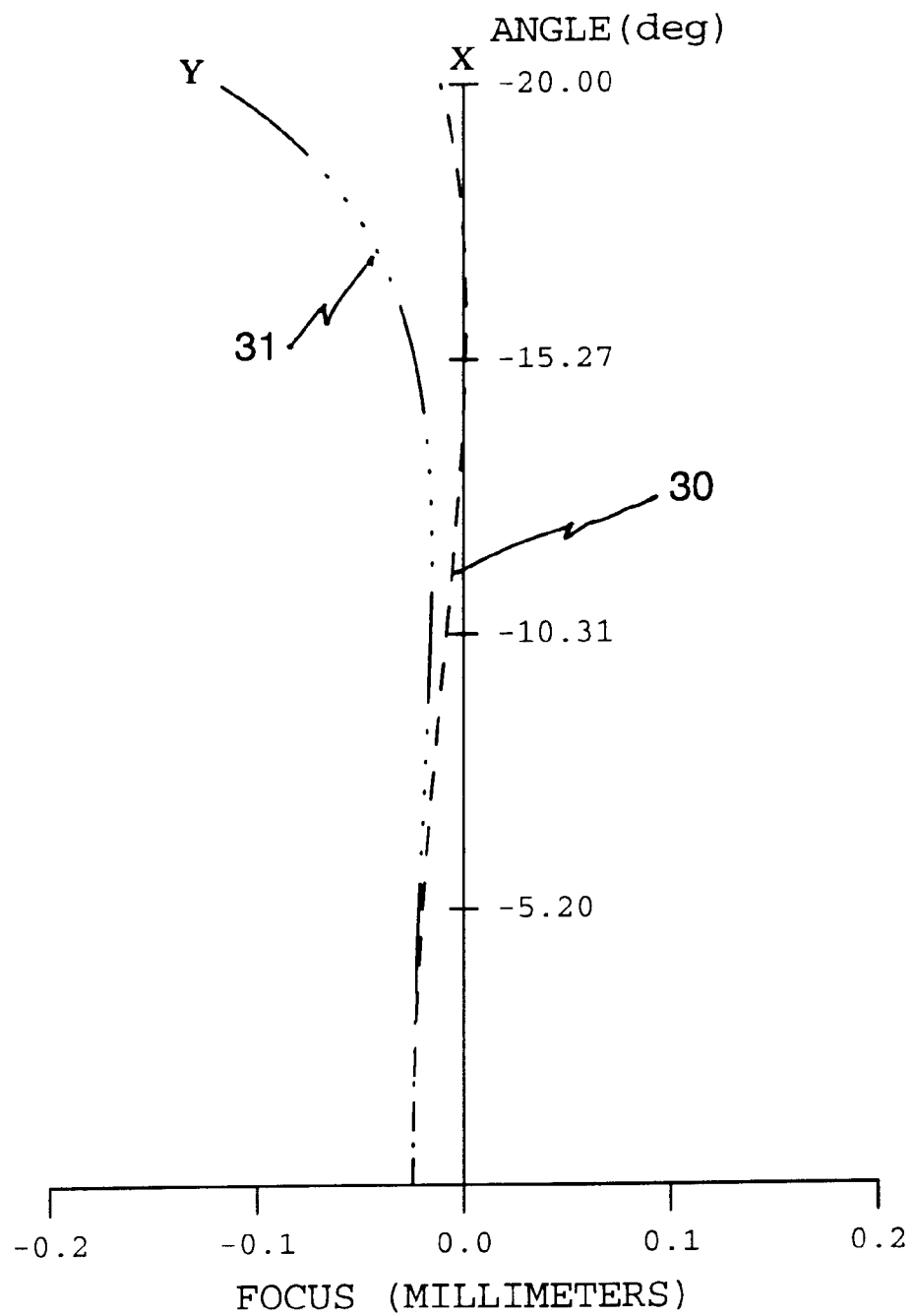
FIG. 3 is an astigmatic field curve graph for the invention.
Figure 4:
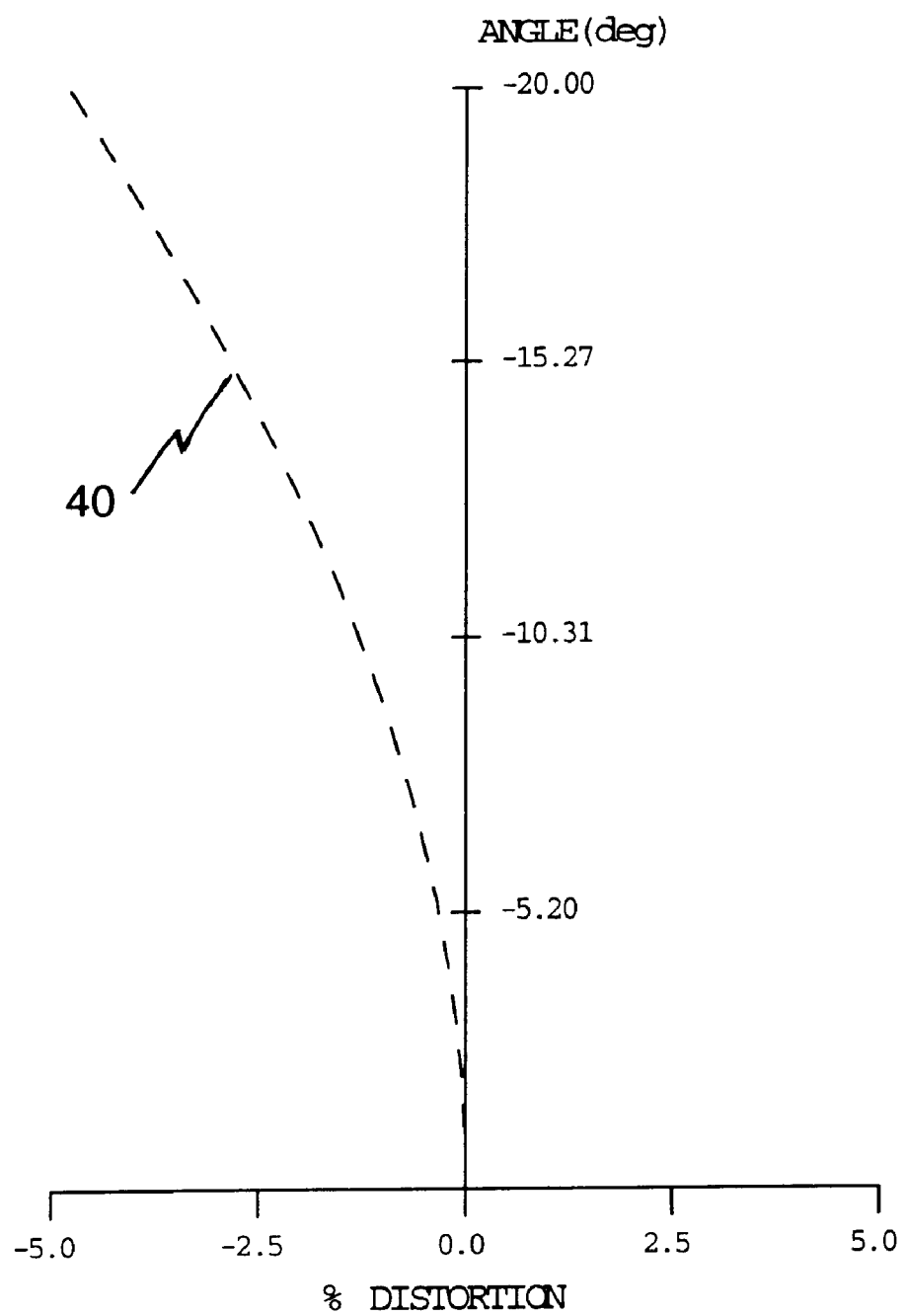
FIG. 4 is a distortion graph for the invention.

FIG. 3 and FIG. 4 is the astigmatic field curve graph and distortion graph respectively. In FIG. 3, line 30 is the tangential astigmatic field curve while line 51 is the sagittal component of the asigmatic field curve. As seen in FIG. 3, astigmatism is less than 0.1 mm. In FIG. 4, line 40 is the percent distortion for the objective lens assembly performance. As seen in FIG. 4, distortion is approximately −4.5% at the edge of the field of view.

TABLE 1 is the optical surface prescription data for the objective lens assembly. All dimensions are given in mm, where each thickness is given to the following next surface. A positive radius denotes a concave surface and a negative radius denotes a convex surface.

TABLE ONE

| ELEMENT NUMBER | RADIUS | THICKNESS | MATERIAL |
|---|---|---|---|
| OBJ: | INFINITY | INFINITY | |
| 10 | 23.50276 | 3.200000 | SLAH58_OHARA |
|  | INFINITY | 2.400000 | |
| 11 | −72.54300 | 1.800000 | SF64A_SCHOTT |
|  | 15.26500 | 2.555000 | |
| STOP: | INFINITY | 1.000000 | |
|  | INFINITY | 10.000000 | BK7_SCHOTT |
| 12 | INFINITY | 0.000000 | REFL BK7_SCHOTT |
|  | INFINITY | −10.000000 | BK7_SCHOTT |
|  | INFINITY | −1.000000 | |
| 13 | −28.70000 | −2.000000 | 'R-64' |
| 14 | −30.88000 | −4.000000 | SLAH58_OHARA |
|  | 69.00000 | −0.100000 | |
| 15 | −40.21200 | −7.500000 | SK16_SCHOTT |
| 16 | 20.00000 | −2.000000 | SNPH1_OHARA |
|  | −57.80000 | −1.000000 | |
| 17 | −57.80000 | −6.000000 | SLAH58_OHARA |
|  | 57.80000 | −6.172842 | |
| 18 | 15.35000 | −2.000000 | SNPH1_OHARA |
|  | 75.44608 | −1.522691 | |
| 19 | INFINITY | −3.810000 | '7056' |
|  | INFINITY | −0.025394 | |
| IMG: | INFINITY | 0.025000 | |

Element 12 listed in TABLE 1 is tilted at 45 degrees to the normal resulting in a 90 degree bend in the overall assembly. The aperture dimensions shown for lenses 15, 16, and 17 are slightly oversized and can be reduced if a reduction in weight is desired.

The refractive glass indicies are shown in TABLE 2A and 2B for the glass materials utilized, since glass compositions are known to possibly change over time. Wavelengths shown are given in nm for both TABLE 2A and 2B.

TABLE 2A

|  | 921.00 | 900.00 | 852.10 | 800.00 |
|---|---|---|---|---|
| SLAH58_OHARA | 1.863269 | 1.863971 | 1.865722 | 1.867922 |
| SF64A_SCHOTT | 1.685595 | 1.686292 | 1.688040 | 1.690253 |
| 'R-64' | 1.519066 | 1.519363 | 1.520144 | 1.521206 |
| SK16_SCHOTT | 1.610307 | 1.610704 | 1.611674 | 1.612860 |
| SNPH1_OHARA | 1.778386 | 1.779376 | 1.781873 | 1.785057 |
| '7056' | 1.477529 | 1.477965 | 1.479011 | 1.480236 |
| BK7_SCHOTT | 1.508665 | 1.508997 | 1.509803 | 1.510776 |

TABLE 2B

|  | 706.50 | 656.30 | 632.80 |
|---|---|---|---|
| SLAH58_OHARA | 1.872979 | 1.876558 | 1.878524 |
| SF64A_SCHOTT | 1.695403 | 1.699097 | 1.701145 |
| 'R-64' | 1.524000 | 1.525999 | 1.526076 |
| SK16_SCHOTT | 1.615479 | 1.617271 | 1.618239 |
| SNPH1_OHARA | 1.792558 | 1.798005 | 1.801048 |
| '7056' | 1.482702 | 1.484191 | 1.484933 |
| BK7_SCHOTT | 1.512893 | 1.514321 | 1.515089 |

Table 3 describes vignetting amounts across X-Y pupil dimensions for each of the specified field of view angles.

TABLE 3

|  | 0.00000 | 14.00000 | 20.00000 | −20.00000 |
|---|---|---|---|---|
| Upper X | 0.00000 | 0.12941 | 0.31143 | 0.31143 |
| Lower X | 0.00000 | 0.12941 | 0.31143 | 0.31143 |
| Upper Y | 0.00000 | 0.49274 | 0.77487 | 0.25119 |
| Lower Y | 0.00000 | 0.14454 | 0.25119 | 0.77487 |

TABLE 4 discloses a center of mass analysis for the objective lens assembly of the invention. Volume and weight are measured in liters and grams respectively with the center of mass defined on a standard X-Y-Z Cartesian coordinate system.

TABLE 4

| ELEMENT NUMBER | VOLUME | GRAVITY | WEIGHT | X | Y | Z |
|---|---|---|---|---|---|---|
| 1 | 711.644 | 5.520 | 3.928 | 0.000 | 0.000 | 2.107 |
| 2 | 1273.591 | 3.000 | 3.821 | 0.000 | 0.000 | 1.719 |
| 3 | 2372.682 | 2.510 | 5.955 | 0.000 | −1.887 | 5.944 |
| 4 | 1871.838 | 2.510 | 4.698 | 0.000 | 9.697 | −3.428 |
| 5 | 7005.638 | 2.510 | 17.584 | 0.000 | 0.000 | −5.000 |
| 6 | 760.951 | 2.680 | 2.039 | 0.000 | 0.000 | −2.072 |
| 7 | 1002.962 | 5.520 | 5.536 | 0.000 | 0.000 | −2.238 |
| 8 | 2133.733 | 3.580 | 7.639 | 0.000 | 0.000 | −3.346 |
| 9 | 2166.424 | 3.290 | 7.128 | 0.000 | 0.000 | −0.183 |
| 10 | 2166.066 | 5.520 | 11.957 | 0.000 | 0.000 | −3.000 |
| 11 | 889.357 | 3.290 | 2.926 | 0.000 | 0.000 | 0.023 |
| 12 | 1181.296 | 2.392 | 2.826 | 0.000 | 0.000 | −1.905 |

A total weight is 76.03742 grams with a system center of mass at (0.000, −14.889, 18.405) measured from the first surface of the system.

TABLE 5 describes the first order parameters and infinite conjugates for the objective lens assembly of the invention where dimensions are in mm.

TABLE 5

| Focal Length | 26.0000 |
|---|---|
| Back Focal Length | 0.0502 |
| Front Focal Length | 9.3691 |
| F# | 1.3607 |
| Parax Image Height | 9.4632 |
| Max Field Angle | 20.0000 |
| Entrance Pupil Diam | 19.1073 |
| Exit Pupil Diam | 25.4962 |

As seen in TABLE 5, the objective lens assembly performs at a reasonably fast F# of 1.36, with a focal length of 26 mm, which results in a nominal field of view of 38.2 degrees over an 18 mm image plane format height. Since the distortion of the lens is approximately −4.5% as shown in FIG. 4, the actual field of view on an 18 mm format is about 40 degrees.

The image intensifier objective lens is optimized for use over the 0.6 to 0.9 micron spectral band with a fast F# between 1.0 and 1.5, and with a field of view 35 to 45 degrees, that features an internal right angle fold prism to bend the optical axis 90 degrees. The fold prism, as a glass prism, is located between a negative front element group and a rearward positive group, which is then followed by a negative field flattening lens and then onward to the intensifier faceplate. The invention can be used with a standard military Third Generation Image Intensifier Tube assembly utilizing a relatively fast F# objective lens with a wide 40 degree field of view and low distortion.

While this invention has been described in terms of preferred embodiment consisting of an objective lens assembly, those skilled in the art will recognize that the invention can be practiced with modification within the spirit and scope of the appended claims.

Having thus described my invention, what I claim as new and desire to secure by Letters Patent is as follows:

1. An objective lens assembly for use in an image intensifier over the 0.6 to 0.9 micron spectral bandwidth comprising:
    an air-spaced doublet on the optical axis for collecting and focusing light entering the assembly;
    a right angle fold prism after the air-spaced doublet on the optical axis for bending the optical axis 90 degrees to a reoriented optical axis;
    a first lens subassembly after the right angle fold prism on the reoriented optical axis for aberration correction;
    a second lens subassembly after the first lens subassembly on the reoriented optical axis for focusing light from the first lens subassembly, said second lens subassembly further including a doublet and a single lens; and,
    a lens element after said second lens subassembly on the reoriented optical axis for image plane field flattening over an intensifier image field format whereby there results an F# within a range of 1.0 to 1.5 and a field of view within the range of 35 to 45 degrees, the objective lens assembly including a 90 degree optical axis bend.

2. The objective lens assembly of claim 1 wherein said first lens subassembly further includes a positive powered doublet.

3. The objective lens assembly of claim 2 wherein said positive powered doublet includes a lens element comprising filter glass.

4. The objective lens assembly of claim 3 wherein said positive powered doublet includes a lens element comprising clear glass.

5. A technique for providing an objective lens for use in an image intensifier over the 0.6 to 0.9 micron spectral bandwidth including a 90 degree optical axis bend comprising the steps of:
    collecting and focusing light entering the assembly on the optical axis;
    bending the optical axis 90 degrees to a reoriented optical axis;
    aberration correction of light on the reoriented optical axis as aberration corrected light with a first lens subassembly;
    focusing of the aberration corrected light as focused light with a second lens subassembly, said second lens subassembly including a doublet and a single lens; and,
    image plane field flattening over an intensifier image field format of the focused light whereby there results an F# within a range of 1.0 to 1.5 and a field of view within the range of 35 to 45 degrees, the objective lens assembly including a 90 degree optical axis bend.

6. The technique of claim 5, wherein said focusing step is accomplished with a second lens subassembly that includes a cemented triplet.

7. An objective lens assembly for use in an image intensifier over the 0.6 to 0.9 micron spectral bandwidth comprising:
    an air-spaced doublet on the optical axis for collecting and focusing light entering the assembly;
    a right angle fold prism after the air-spaced doublet on the optical axis for bending the optical axis 90 degrees to a reoriented optical axis;
    a first lens subassembly after the right angle fold prism on the reoriented optical axis for aberration correction;
    a second lens subassembly after the first lens subassembly on the reoriented optical axis for focusing light from the first lens subassembly, said second lens subassembly further including a cemented triplet; and,
    a lens element after said second lens subassembly on the reoriented optical axis for image plane field flattening over an intensifer image field format whereby there results an F# within a range of 1.0 to 1.5 and a field of view within the range of 35 to 45 degrees, the objective lens assembly including a 90 degree optical axis bend.

8. The lens assembly of claim 7, wherein said first lens assembly further includes a positive powered doublet.

9. The lens assembly of said claim 8, wherein said positive powered doublet includes a lens element comprising filter glass.

10. The lens assembly of claim 9, wherein said positive powered doublet includes a lens element comprising clear glass.

* * * * *